United States Patent [19]

Hite

[11] Patent Number: 4,690,318

[45] Date of Patent: Sep. 1, 1987

[54] SOLDER DISPENSER

[76] Inventor: John D. Hite, 206 Brewster Ave., Silverspring, Md. 20901

[21] Appl. No.: 913,298

[22] Filed: Sep. 30, 1986

[51] Int. Cl.$^4$ ............................................. B23K 20/26
[52] U.S. Cl. ............................................. 228/57; 2/8; 362/105
[58] Field of Search ................... 228/57; 362/105, 106; 2/171, 209.2, DIG. 11, 8; 222/175; 128/200.28, 201.15, 201.24

[56] References Cited

U.S. PATENT DOCUMENTS 2,086,208  7/1937  Brekelbaum ................................ 2/8
3,069,538  12/1962  Hobson ................................ 362/105
3,398,874  9/1968  Sauer ................................ 228/51

FOREIGN PATENT DOCUMENTS 7510361  10/1976  France ................................ 362/105

Primary Examiner—Fred A. Silverberg
Assistant Examiner—Karen Skillman
Attorney, Agent, or Firm—Saul Elbaum; Alan J. Kennedy; Tom McConald

[57] ABSTRACT

A head worn device for feeding solder wire from a spool during a soldering operation while using a soldering iron. The device includes a semi-flexible tube that has one end portion mounted on the head worn device. A rotatable spool of wire solder is affixed to the head worn device near the mounted end of the tube. The wire solder is ducted through the tube to the opposite end which is open so that a short length of solder can be exposed. Therefore, the operator can apply the wire solder during a soldering operation while keeping both hands free to handle the soldering iron and position the workpiece or component.

20 Claims, 2 Drawing Figures

SOLDER DISPENSER

RIGHTS OF THE GOVERNMENT

The invention described herein may be manufactured and used by or for the United States Government for governmental purposes without the payment to me of any royalty thereon.

BACKGROUND OF THE INVENTION

1. Field of the Invention

This invention relates to a solder dispensing tool and particularly to an improved tool for dispensing solder while using a pencil type soldering ion.

2. Description of the Prior Art

Great difficulty can be encountered in situations where very small electronic components must be joined using soldering techniques. This is particularly true when miniature components such as chip capacitors, thick-film chip resistors, unpackaged inductors, leadless semiconductor devices, small diameter semi-rigid coaxial cable, and so on, must be installed into electronic circuit assemblies. Many applications utilizing these kinds of miniature parts may also be circuits designed for service at radio frequency (RF) or microwave frequencies. When this is the case, it is usually imperative that the parts be located precisely and that the resulting solder joints be uniform in size and of high quality.

This can sometimes be accomplished by employing paste solder using reflor sodlering techniques. This requires that the paste be applied to the circuit substrate while accurately controlling both the quantity and location of the solder. The joint is then formed by heating the substrate from below using a hot plate or from above using an infrared source (as used in Surface Mount Device technology). However, if the substrate either cannot withstand the sustained high temperatures used during reflow or does not have sufficient thermal conductivity, conventional reflow soldering is not possible. As an example, many soft substrates (non-ceramic) will not be candidates for reflow soldering. Furthermore, reflow soldering requires that all of the components to be attached be of similar thermal mass. This is not always possible.

It is normal for all of a circuit assembly's solder joints to be formed simultaneously when using reflow techniques. However, particularly during development design efforts, it is necessary to be able to repeatedly and individually form solder joints for one part while not disturbing others nearby (rework). When a solder joint melts and solidifies over and over again, poor mechanical and electrical performance results. Individual, isolated point by point soldering can be used to eliminate this problem.

Though it is unusual to do so, one can use paste solder while using a hand soldering pencil. However, poor joint quality can result due to paste metering problems and the uncontrolled loss of solder on the tip of the iron when it is removed from the molten joint. Also, this technique does not allow rapid and multiple rework while insuring that the solder joint has high electrical and mechanical integrity.

A possible solution is to use a hand operated soldering pencil and small gauge wire solder. This will then allow the operator to apply the exact amount of solder needed and to the exact location required. The characteristics of each solder joint can be adjusted as needed. However, this kind of soldering leads to a classic problem, as follows.

The miniature electronic components must be handled delicately, placed with precision, and held firmly during attachment. The soldering pencil must be placed at the optimum location to form the joint and for as short a period of time as possible. The wire solder needs to be fed to the joint as it is formed with precise control over the quantity of solder and the rate and point of application. An individual operator will find it virtually impossible to simultaneously hold and accurately control these three items.

Dispensers for feeding solder to the tips of soldering irons are known in the art. It is even shown in U.S. Pat. Nos. 3,996,109 and 4,507,545 that there are solder dispensers that can be directly attached to pencil-type soldering irons. These permit one-handed soldering operation, of a sort. However, the solder is usally applied to the iron's tip rather than directly to the joint as is proper. The solder feed rate is difficult to control. And independent adjustment of the relative locations of the component, iron tip, and wire solder cannot be achieved. Finally, these solder dispensers are far more complicated in construction and more expensive than the invention disclosed herein.

SUMMARY OF THE INVENTION

The described invention is a unique head worn device that will enable a person to feed or dispense wire solder and position the solder in a precise and well controlled manner during the soldering operation. This will then leave the operators hands free to manipulate the soldering iron and to position and carefully hold the electronic component. The latter can be done using Teflon tweezers, for instance.

Solder wire is dispensed from a rotatable spool that is mounted on a headband. The solder is then fed into the inlet of a semiflexible guide tube that is also mounted on the headband. The outlet from the guide tube is extended forward from the headband such that it is positioned approximately one foot in front of the operator's eyes when the headband is worn. The exact outlet point can be optimized by each operator according to their own preferences and vision requirements. The solder is then advanced through the guide tube outlet exposing a short length wire solder.

The operator can now precisely position the end of the wire solder at the exact location and angle to engage in soldering. In addition, the rate of application of the solder can be readily controlled by the fine adjustment of the position and tilt of the operator's head.

The viability of this approach to soldering has been shown experimentally. An operator could exercise extremely accurate and stable control over his or her head position, even if his or her hands were in moderate motion. Therefore, with care, minute adjustments to the position of the solder at the output of the feed tube can be managed.

OBJECT OF THE INVENTION

1. An object of the invention is to provide a head worn apparatus that is utilized to dispense wire solder in a precise manner during the soldering operation.

2. Another object of this invention is to provide a solder dispensing device that will allow one person to simultaneously:
   a. precisely locate the miniature component to be soldered.
   b. apply wire solder to the component.
   c. manipulate the soldering iron.

DESCRIPTION OF THE PREFERRED EMBODIMENT

Figure 1:
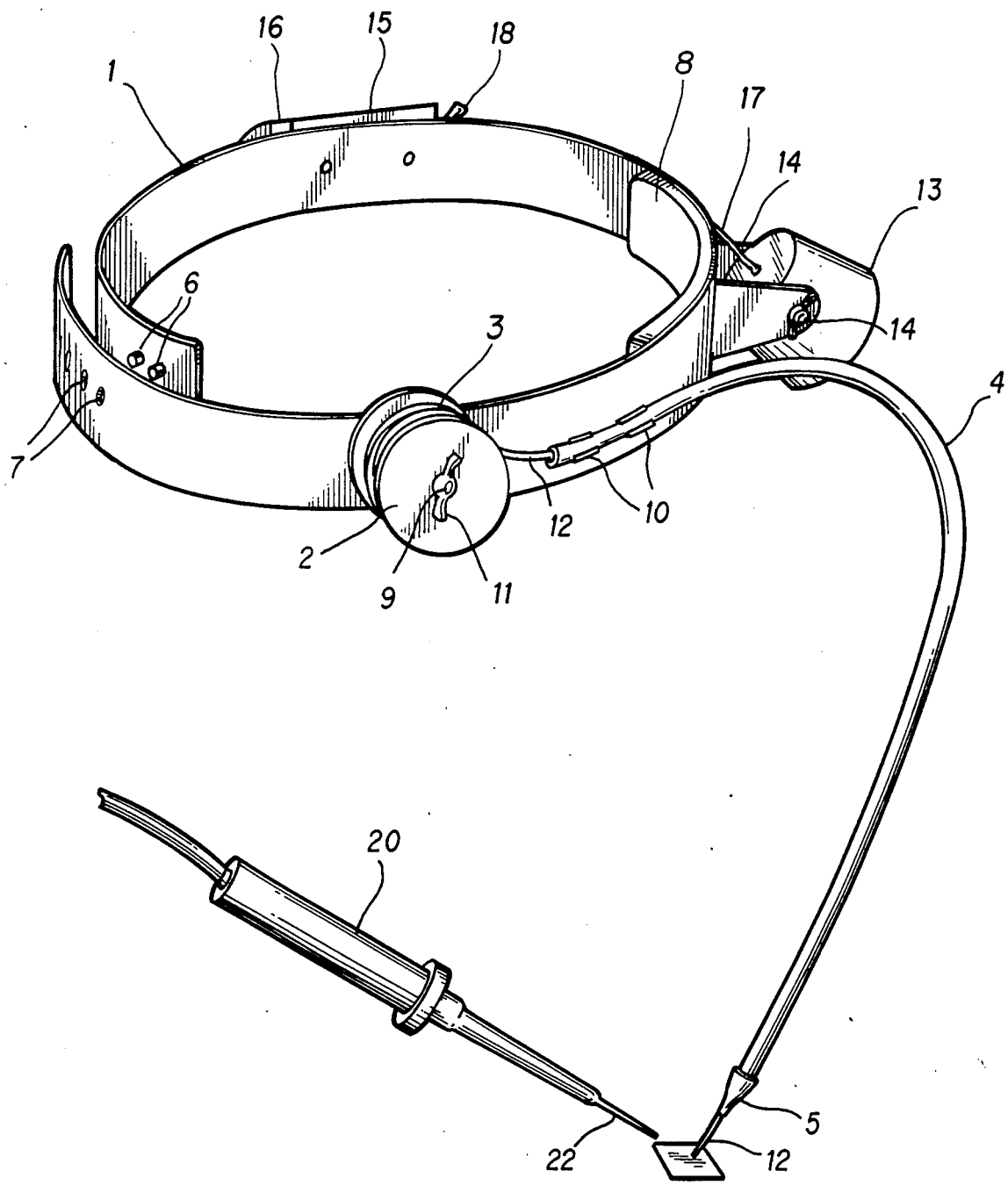
FIG. 1 discloses a plan view of the solder dispenser.

The solder dispensing device of the present invention is disclosed generally in FIG. 1. The primary features include an ajustable sized headband (1), a spool for holding wire solder (2), the roll of wire solder (3), a hollow, semi-flexible feedtube (4) for the wire solder to pass through, and a plastic end tip (5) to hold the wire solder in place during the soldering operation.

The headband (1) is made of metal, however it could more appropriately be made of plastic or another material as long as its thickness and composition would allow the band to be somewhat flexible and to adapt to varying head shapes. The headband is designed to be adjustable for differing head sizes by means of two studs (6) at the rear of the band that snap into any two of a series of holes (7) on the other end of the band. At the front of the headband on the inside surface is a soft, absorbent pad (8) to enhance operator comfort.

The solder dispensing assembly consists of the aforementioned solder spool (2) which can freely rotate about a shaft (9) attached to the right side of the headband. The spool is wrapped with a roll of wire solder (3). The spool is held to the shaft by a removable clip fastener (11) so that the spool can be easily removed for refilling or replacement with different diameters or types of solder at the descretion of the operator. The solder wire is fed to the input end of the feed tube (4). The feed tube (4) is a hollow semi-flexible tube that is rigidly attached at now less than two points (10) to the front of the headband. The feedtube (4) must be made of a flexible material such as copper tubing or some corrugated metal or plastic so that it can be bent slightly while still firmly holding its position after adjustment. The feedtube (4) should have an inside diameter of a least one eighth of an inch so that the wire solder can pass freely.

During installation of the solder spool, the operator feeds the wire solder through the feed tube (4) until it protrudes from the output end of the tube with two to three inches of solder exposed. After selection of the appropriate sized plastic end tip (5) for the chosen solder's diameter, the wire solder is fed through the tip, and the tip is installed onto the feed tube at its output.

Then, by a combination of rotating the solder spool (2) and/or pulling the solder through the plastic tube (5), the working length of the solder can be adjusted. Due to the flexible nature of the feed tube, the operator can now adjust the distance from his eyes to the end of the working length of solder wire by simply bending the tube. For most people, this distance should be from 10 to 16 inches for best visibility at their optimum close focusing point as is illustrated in FIG. 2.

Once the feedtube's position has been adjusted and the working length of exposed solder at the output end of the tube has been set, the operator can now supply additional illumination to the work area by use of an attached lamp assembly (13). This consists of a small, battery powered lamp (13) which is attached to the front of the headband (1) by two support brackets and hinge assembly (14). The lamp housing contains a focusing lens to concentrate the light on the soldering operation. To compensate for the various adjustments previously described, the lamp can be swiveled for the best lighting of the workspace while not creating excessive glare for the operator. A battery pack (15) is provided to power the lamp. This consists of a small housing (15) attached to the left side of the headband with a removable end cap (16) for the installation of batteries. Battery power is controlled by a switch (18) mounted to the battery housing. The power is then supplied to the lamp assembly by means of the wires (17) shown. The battery pack and lamp assemblies were designed separately rather than integrated into one housing. As a result, the lamp and support brackets could be made as small and light weight as possible while placing the relatively heavy batteries on the side of the operator's head. By placing the batteries on the side of the headband rather than on the front, any operator muscular fatigue should be minimized during use of this soldering aid.

Figure 2:
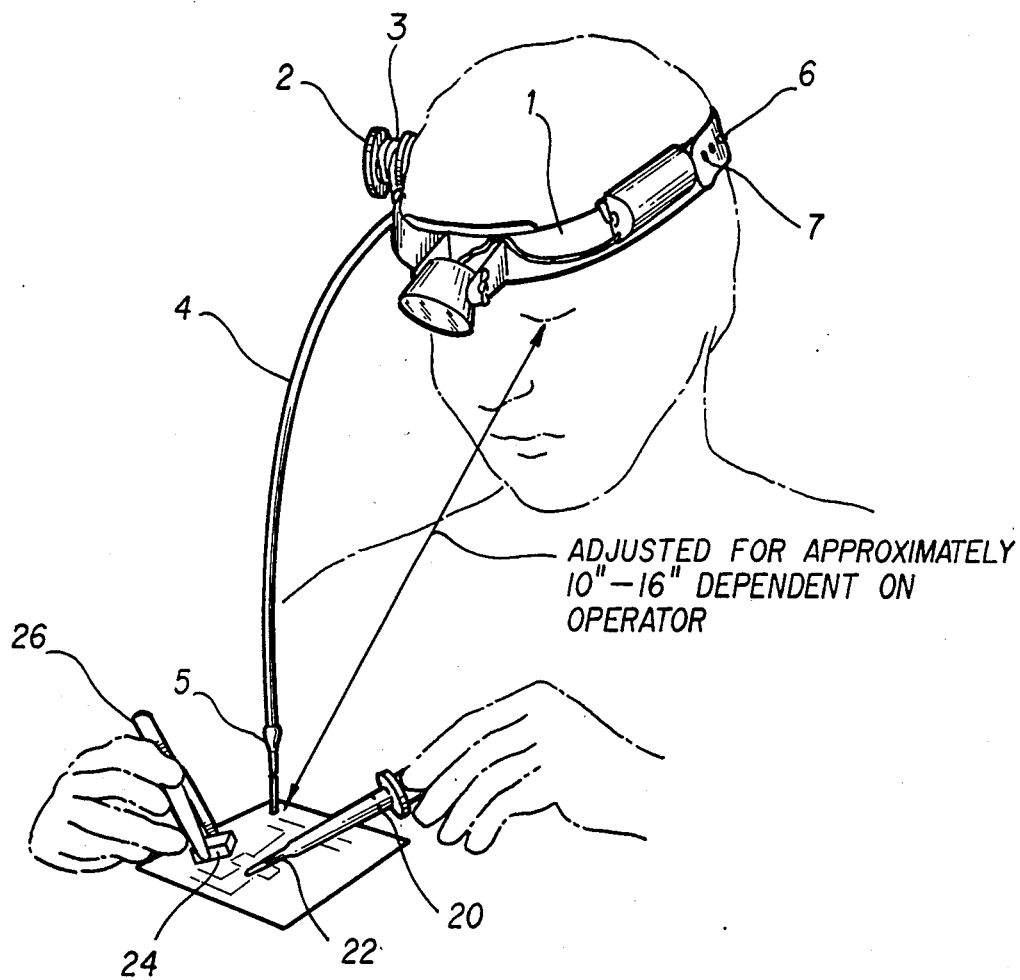
FIG. 2 discloses an illustration of the solder dispenser as used by an operator.

In operation referring to FIGS. 1 and 2, the user places headband (1) upon his head aligning headband (1) such that the far end of feed tube (4) is positioned directly in front of one eye. Solder wire (12) is manually pulled from spool (2) and threaded into feed tube (4) until a short, exposed length of solder wire (12) eventually projects out of the opening of guide cap (5). The user can now precisely place workpiece (24) in position for soldering, such as by holding the electronic component (24) to be soldered in place using teflon tweezers (26). The operator or user moves the exposed length of solder (12) into position for soldering by physically moving his head. Preheated tip (22) can now be utilized to heat the junction between the two members to be soldered together. After each soldering operation spool (2) can be rotated to advance another length of exposed wire (12) through guide cap (5) by manually pulling or advancing wire solder (12) through guide cap (5). The unique feature about this operation is that by feeding the solder wire to the solder joint using this head worn device, the user's hands are now independently free to hold the workpiece (24) in place and manipulate the soldering iron (20).

Although a preferred embodiment of the present invention has been described and disclosed, changes will obviously occur to those skilled in the art without departing from the spirit thereof. It is, therefore, intended that the invention is to be limited only by the scope of the appended claims.

What is claimed is:

1. A head worn solder dispensing device comprising:
   a head worn housing;
   a supply of solder mounted onto said housing;
   a means for dispensing said solder;
   a guide means attached to said housing having an inlet for receiving said solder and directing said solder along a predetermined path extending through an outlet to a location where said solder may be applied to a work piece while being heated.

2. The device of claim 1 wherein said housing is comprised of a headband.

3. The device of claim 2 wherein said headband has an adjustable circumference.

4. The device of claim 2 wherein said headband has an absorbent forehead pad.

5. The device of claim 1 wherein said solder supply is comprised of a spool of solder wire.

6. The device of claim 5 wherein said means for dispensing said spool of solder wire comprises a rotatable spindle.

7. The device of claim 5 wherein said spindle is removable.

8. The device of claim 7 wherein said rotatable spindle is held in place by a manually operated spring clip.

9. The device of claim 1 wherein said guide means is comprised of a length of tubing.

10. The device of claim 9 wherein said tubing is comprised of a semi-flexible material.

11. The device of claim 1 further including a means to illuminate said work piece.

12. The device of claim 9 wherein the input end of said tubing is rigidly attached to the front of the headband.

13. The device of claim 9 wherein said tubing has a guide tip attache dot the end opposite said headband.

14. The device of claim 13 wherein said guide tip is comprised of plastic material.

15. The device of claim 13 wherein said guide tip is comprised of composite material.

16. The device of claim 13 wherein said guide tip includes an aperture at the end opposite to the attached said guide tube to allow the solder wire to protrude.

17. The device of claim 11 wherein said illumination means is comprised of a lamp housing assembly.

18. The device of claim 17 wherein said lamp housing is attached to the front of the said headband.

19. The device of claim 17 wherein said lamp housing is comprised of light bulb; a light bulb socket; wiring; a focusing lens; and a small package to contain these.

20. The device of claim 17 wherein said illumination means is powered by one or more batteries.

* * * * *